US011284272B2

United States Patent
Nekoui et al.

(10) Patent No.: US 11,284,272 B2
(45) Date of Patent: Mar. 22, 2022

(54) INTERFERENCE-AWARE AUTONOMOUS VEHICLE ROUTING AMONG CBSDS

(71) Applicant: FORD GLOBAL TECHNOLOGIES, LLC, Dearborn, MI (US)

(72) Inventors: Mohammad Nekoui, Novi, MI (US); Navid Tafaghodi Khajavi, Troy, MI (US); Hamed Asadi, Troy, MI (US); Mohsen Bahrami, Troy, MI (US); Amin Ariannezhad, Troy, MI (US); Praveen Kumar Yalavarty, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 16/995,664

(22) Filed: Aug. 17, 2020

(65) Prior Publication Data
US 2022/0053338 A1 Feb. 17, 2022

(51) Int. Cl.
| | |
|---|---|
| *H04W 16/14* | (2009.01) |
| *H04W 72/04* | (2009.01) |
| *H04L 41/0896* | (2022.01) |
| *H04W 72/08* | (2009.01) |
| *H04L 47/70* | (2022.01) |
| *H04L 12/70* | (2013.01) |

(52) U.S. Cl.
CPC ......... *H04W 16/14* (2013.01); *H04L 41/0896* (2013.01); *H04L 47/70* (2013.01); *H04W 72/0453* (2013.01); *H04W 72/082* (2013.01); *H04L 2012/5632* (2013.01)

(58) Field of Classification Search
CPC .................................................... H04W 16/14
See application file for complete search history.

(56) References Cited

U.S. PATENT DOCUMENTS

| | | | |
|---|---|---|---|
| 10,334,446 | B2 | 6/2019 | Ashrafi |
| 2015/0358990 | A1 | 12/2015 | Kovacs et al. |
| 2018/0132112 | A1* | 5/2018 | Khoshnevisan .. H04W 72/0453 |
| 2018/0242165 | A1* | 8/2018 | Macmullan ......... H04W 72/048 |
| 2018/0351622 | A1* | 12/2018 | Xi ........................ H04W 72/085 |
| 2019/0373610 | A1 | 12/2019 | Cimpu et al. |
| 2020/0187058 | A1* | 6/2020 | Yoo ..................... H04W 72/048 |
| 2021/0306911 | A1* | 9/2021 | Nekoui ................. H04W 28/06 |

* cited by examiner

*Primary Examiner* — Jason E Mattis
(74) *Attorney, Agent, or Firm* — Michael J. Spenner; Brooks Kushman P.C.

(57) ABSTRACT

A graph of devices is constructed, each network device serving an amount of bandwidth over the network, each vertex of the graph corresponding to a respective one of the network devices, each edge of the graph connecting network devices by interference weight, such that edges between connected network devices using different channels have an interference weight of zero, and edges between connected network devices using the same channel have an interference weight denoting an amount of interference between the connected network devices. A cell utilization of each of the network devices is determined according to an amount of traffic served by the respective network device compared to a total of the amounts of bandwidth for all network devices. A vehicle requesting bandwidth is assigned to the one of the network devices having a smallest product of cell utilization and maximum interference weight edge.

18 Claims, 10 Drawing Sheets

INTERFERENCE-AWARE AUTONOMOUS VEHICLE ROUTING AMONG CBSDS

TECHNICAL FIELD

Aspects of the present disclosure generally relate to interference-aware non-homogenous channel assignment for citizens broadband radio service devices, as well as routing of vehicles among the citizens broadband radio service devices.

BACKGROUND

Autonomous vehicles may utilize vehicle-to-vehicle (V2V) communications to communicate data between vehicles. Autonomous vehicles may also utilize vehicle-to-infrastructure (V2I) to communicate data between the vehicles and infrastructure. This data may include sensor information collected by the vehicles.

The Citizens Broadband Radio Service (CBRS) is 150 MHz of spectrum in the 3500 MHz band that is reserved for commercial use. CBRS devices (sometimes referred to as CBSDs) may access the CBRS network. The allocation of spectrum within the CBRS band is performed using a spectrum access system (SAS). The SAS operates as automated frequency coordinator to manage the CBRS spectrum.

SUMMARY

In one or more illustrative examples, a system for allocating vehicles among network devices is provided. The system includes a controller of a network, configured to perform an allocation of a set bandwidth. The allocation includes to construct a graph of the network devices, each network device serving an amount of bandwidth over the network, each vertex of the graph corresponding to a respective one of the network devices, each edge of the graph connecting network devices by interference weight, such that edges between connected network devices using different channels have an interference weight of zero, and edges between connected network devices using the same channel have an interference weight denoting an amount of interference between the connected network devices; determine a cell utilization of each of the network devices according to an amount of traffic served by the respective network device compared to a total of the amounts of bandwidth for all network devices; and assign a vehicle requesting bandwidth to the one of the network devices having a smallest product of cell utilization and maximum interference weight edge.

In one or more illustrative examples, a method for allocating vehicles among network devices includes constructing a graph of the network devices, each network device serving an amount of bandwidth over the network, each vertex of the graph corresponding to a respective one of the network devices, each edge of the graph connecting network devices by interference weight, such that edges between connected network devices using different channels have an interference weight of zero, and edges between connected network devices using the same channel have an interference weight denoting an amount of interference between the connected network devices; determining a cell utilization of each of the network devices according to an amount of traffic served by the respective network device compared to a total of the amounts of bandwidth for all network devices; and assigning a vehicle requesting bandwidth to the one of the network devices having a smallest product of cell utilization and maximum interference weight edge.

In one or more illustrative examples, a non-transitory computer readable medium including instructions for allocating vehicles among network devices, that, when executed by a computing device, cause the computing device to perform operations including to construct a graph of the network devices, each network device serving an amount of bandwidth over the network, each vertex of the graph corresponding to a respective one of the network devices, each edge of the graph connecting network devices by interference weight, such that edges between connected network devices using different channels have an interference weight of zero, and edges between connected network devices using the same channel have an interference weight denoting an amount of interference between the connected network devices; determine a cell utilization of each of the network devices according to an amount of traffic served by the respective network device compared to a total of the amounts of bandwidth for all network devices; and assign a vehicle requesting bandwidth to the one of the network devices having a smallest product of cell utilization and maximum interference weight edge.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Aspects of the disclosure relate to use of inhomogeneous frequency planning, where channels of disparate bandwidths are allocated to different CBRS devices (CBSDs) in the network. The disparity in bandwidth allocation may be useful for various scenarios. One such scenario is use by an autonomous vehicle, where terminal layout, structural constraints, and vehicle arrival processes dictate the capacity each base station should provide.

In a 4G/5G private network operating on the CBRS band, interference among the CBSDs can degrade the throughput performance of the network. The amount of mutual interference between CBSDs is proportional to the load served by each, their frequency channel allocations, and RF characteristics of CBSDs and the environment. For autonomous vehicles (AVs) arriving at a terminal facility, smartly assigning the AVs to CBSDs can help minimize such mutual interference and thus increase the throughput of the network. An algorithm that achieves this goal is discussed herein.

Figure 1:
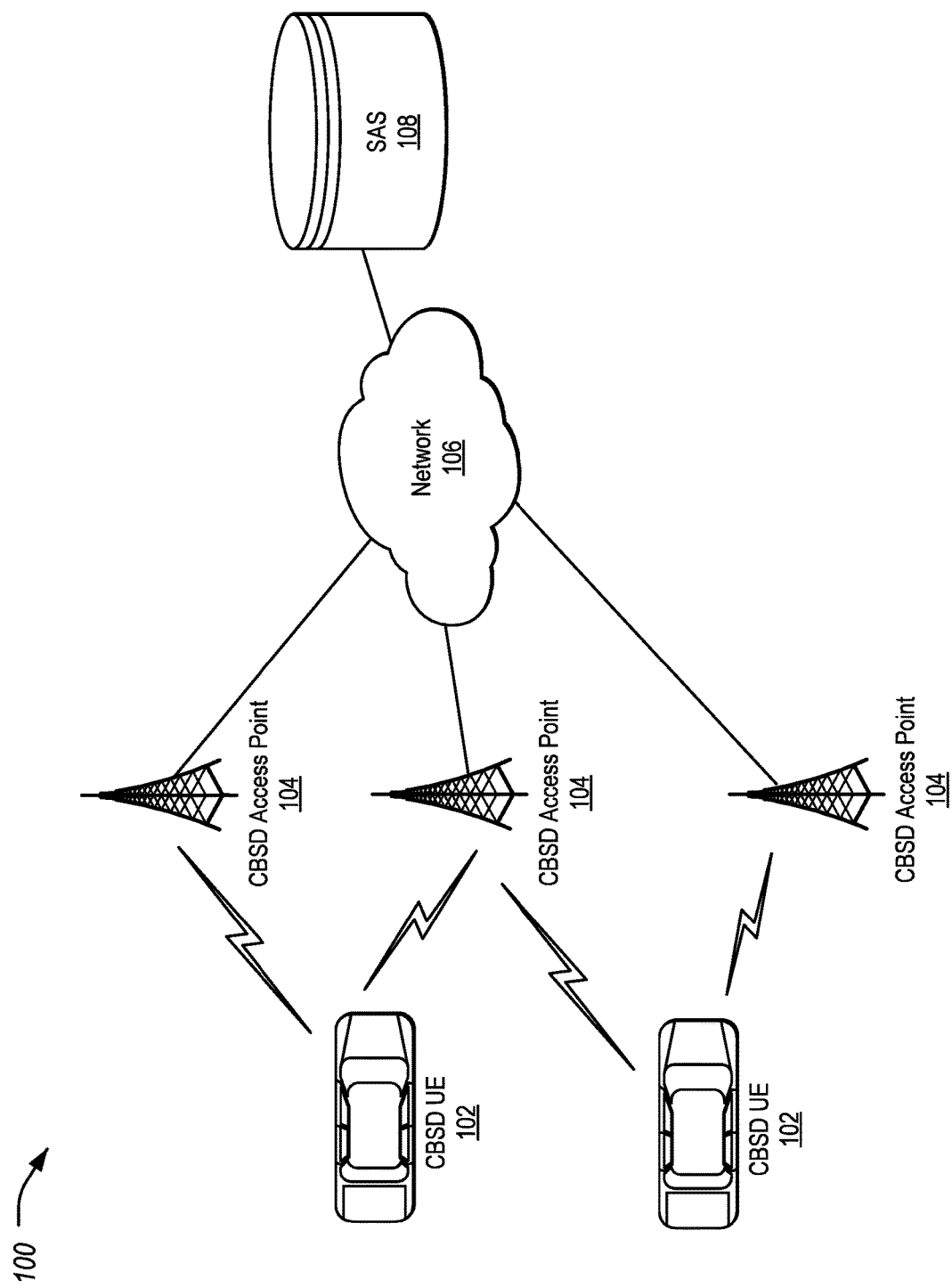
FIG. 1 illustrates an example system for the use of CBRS by vehicles in communication with CBSDs of a network.

FIG. 1 illustrates an example system for the use of CBRS by CBRS user equipment (UE) 102 in communication with CBSDs access points 104 of a network 106. In general, CBRS utilizes spectrum sharing with a three-tiered hierarchy allocating 150 MHz of contiguous spectrum between 3550-3700 MHz. These tiers include top-tier services (e.g., U.S. Navy radars and fixed satellite earth stations), which have top priority, followed by middle-tier services having Priority Access Licensees (PAL) and finally followed by General Authorized Access (GAA) users.

As shown, the CBRS UE 102 are configured to wirelessly communicate with the CBSD access points 104 over the CBRS spectrum, which allow the CBRS UEs 102 to access a private cellular network core 106. In one example, the CBRS UE 102 is embedded in vehicles, such as autonomous vehicles, and is used to support data transfer for such vehicles. In an example, the cellular network core 106 may be a 4G Long Term Evolution (LTE) network core. In another example, the cellular network core 106 may be a 5G network core. In yet a further example the cellular network core 106 may make use of one or more other cellular network technologies. The allocation of spectrum to the CBSD access points 104 is performed by a Spectrum Access System (SAS) 108 entity. The SAS 108 may provide an owner or manager of the network with information about available channels of the cellular network core 106. This information can be utilized to perform frequency planning among the cells. This functionality is typically not provided to customers of conventional LTE networks by mobile network operators (MNOs).

A network typically includes many CBSD access points 104, where each CBSD access point 104 provides wireless communication service to a geographic area surrounding the respective access point 104. These geographic areas served by the CBSD access points 104 may be referred to as cells. Interference between neighboring cells of the cellular network core 106 can adversely affect network performance in terms of throughput and/or latency. This, in turn, may increase data offload times of autonomous vehicles and amounts to increased downtime and operational costs. Accordingly, the SAS 108 may be configured to assign orthogonal channels to interfering cells as a possible approach to use to mitigate the effects of such interference.

Additionally, the SAS 108 may be configured to perform inhomogeneous frequency planning, where channels of disparate bandwidths are allocated to different CBSD access points 104 in the network. The disparity in bandwidth allocation between CBSD access points 104 may be useful for data offload from CBSD UEs 102 of autonomous vehicles, where terminal layout, structural constraints, and vehicle arrival processes dictate the capacity each CBSD access point 104 should provide.

Figure 2:
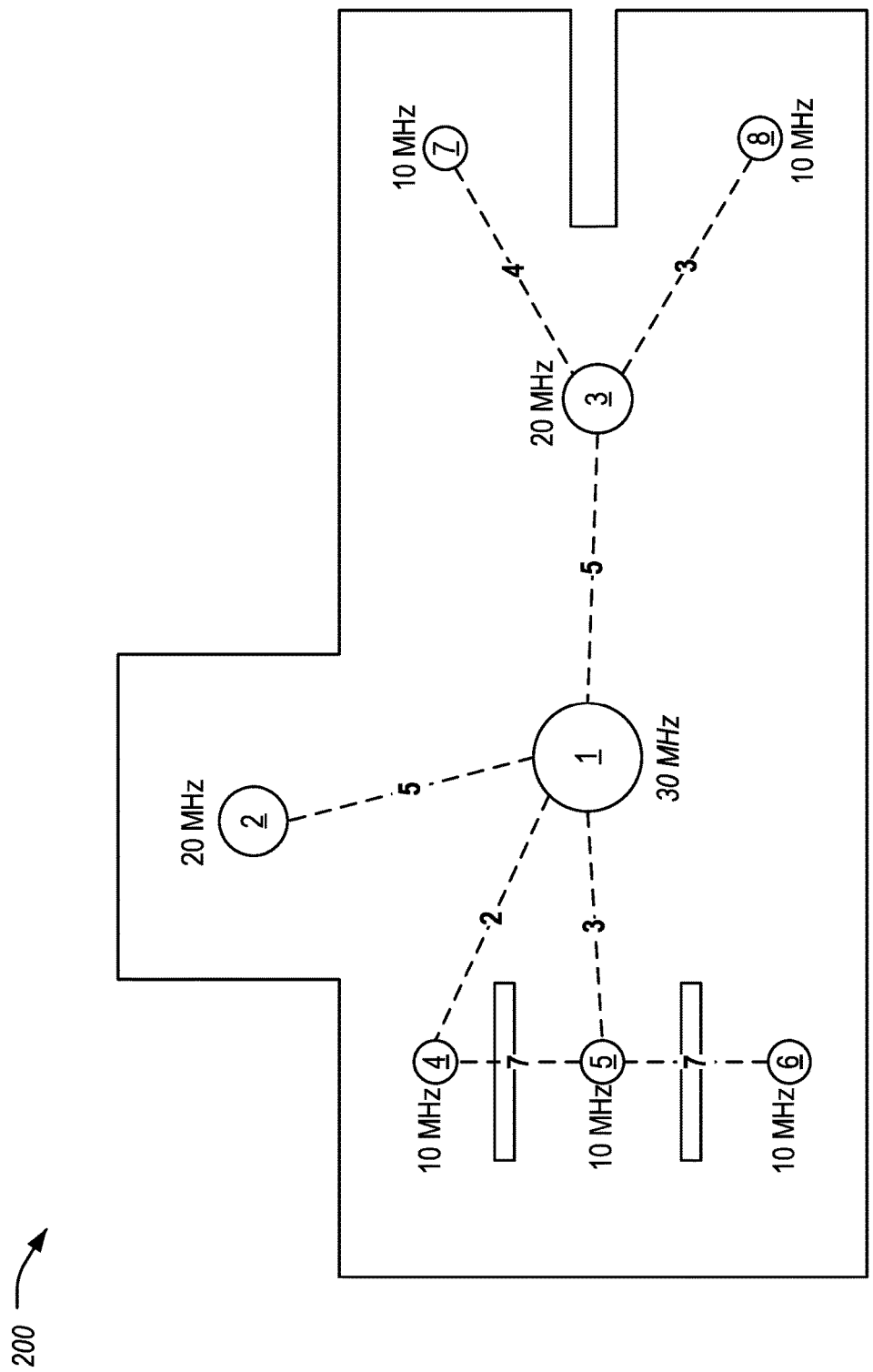
FIG. 2 illustrates an example terminal including a layout of CBSDs, in an example application of inhomogeneous frequency planning.

FIG. 2 illustrates an example terminal 200 including a layout of CBSD access points 104, in an example application of inhomogeneous frequency planning. As noted above, the SAS 108 may provide a range of the frequencies from the 3550-3700 MHz to be shared among the CBSD access points 104. In one simple example, each CBSD access point 104 may be assigned a 10 MHz minimum channel bandwidth within the range allowed by SAS 108. Then, multiple 10 MHz channels (adjacent or non-adjacent) can be aggregated and assigned to a CBSD access point 104 to provide that CBSD access point 104 with a higher capacity.

The SAS 108 may be configured to maintain and access information indicative of the layout of the terminals, the physical characteristics of the environment, and the current locations of the CBSD UEs 102. As shown, the example environment includes eight terminals, which are CBSD access points 104, as well as several obstructions. The CBSD access point 1 has a clear path to each of the access points 2 through 5. However, there is an obstruction between CBSD access points 4 and 5, between CBSD access points 5 and 6, and between CBSD access points 7 and 8.

There may be interference between the CBSD access points 104 due to factors such as the coverage overlap between the CBSD access points 104. Moreover, the amount of interference may depend on factors such as a direction of traffic (upload vs download), transmit power of the CBSD access points 104, obstructions between the CBSD access points 104, and distance between the CBSD access points 104.

To address these issues, the SAS 108 may be configured to create a graph representative of the environment, where vertices of the graph represent CBSD access points 104, and where weighted edges of the graph represent interference due to coverage overlap between the CBSD access points 104. The SAS 108 may then assign orthogonal frequency channels to the vertices connected by the edges. This may be considered to be a graph-coloring-type labeling situation, where the required number of orthogonal channels marks the chromatic number of the graph. No two vertices of the graph may have the same label or color. This ensures that orthogonal frequency channels differ for adjacent vertices of the graph. It should be noted that the term coloring is merely used to indicate the different channel assignment, not that the devices are necessarily physically colored or altered in a specific manner.

As noted above, the CBSD access points 104 may have non-homogeneous bandwidth requirements. Meaning, some CBSD access points 104 may require greater bandwidth than others. The SAS 108 may be configured to color the graph with a minimal number of colors or labels. CBSD access points 104 having the same colors or label may be assigned the same or overlapping frequency ranges. If the total-allocated bandwidth for the total set of colors exceeds that designated by the SAS 108, then the SAS 108 may delete the edge with the least weight (e.g., having the least interference). The SAS 108 may then attempt to recolor the graph. This process may continue until the total allocated bandwidth fits within the range designated by SAS 108.

As shown in the terminal 200, CBSD access point 1 is allocated 30 MHz, CBSD access point 2 is allocated 20 MHz, and each of CBSD access points 3-8 is allocated 10 MHz. Moreover, in the layout of the terminal 200, the interference weight for the edge between CBSD access points 1 and 2 is 5, between CBSD access points 1 and 3 is 5, between CBSD access points 1 and 4 is 2, between CBSD access points 1 and 5 is 3, between CBSD access points 5 and 6 is 7, between CBSD access points 3 and 7 is 4 and between CBSD access points 3 and 8 is 3. It should be noted that in this example the interference scores between the CBSD access points ranges from 1 to 10, where 10 denotes maximum interference. However, this is arbitrary and other scales or methods of ranking the relative interference may be used.

Figure 3:
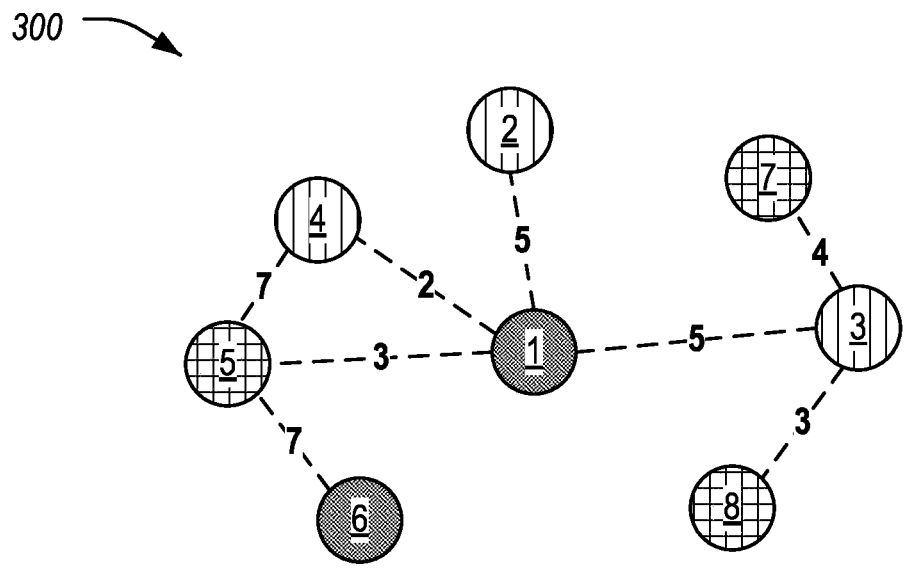
FIG. 3 illustrates an example graph coloring of the layout of the terminal of FIG. 2 utilizing three colors.

FIG. 3 illustrates an example graph coloring 300 of the layout of the terminal 200 utilizing three colors. As shown, the coloring divides the nodes into three color groups: a first group including CBSD access points 1 and 6; a second group including CBSD access points 2, 3 and 4; and a third group including CBSD access points 5, 7 and 8. Each group is associated with a different range of frequency channels, such that CBSD access points within a group are assigned channels from the frequency channels within the range of bandwidth of the group. As a result, CBSD access points in different groups are assigned orthogonal frequency channels.

Figure 4:
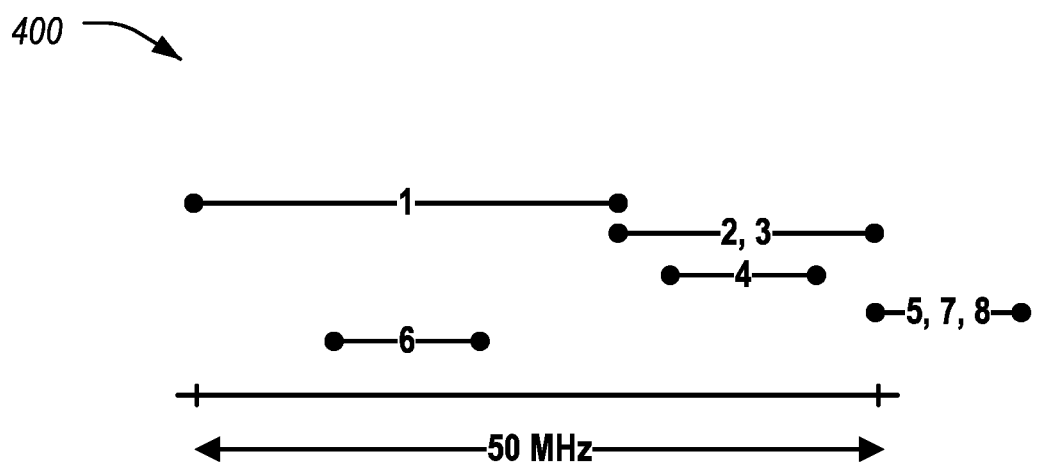
FIG. 4 illustrates an example allocation of bandwidth to the CBSD access points in accordance with the graph coloring of FIG. 3.

FIG. 4 illustrates an example allocation of bandwidth 400 to the CBSD access points in accordance with the graph coloring 300. In the example the SAS 108 is authorized to allocate 50 MHz among the nodes. As shown in the allocation of bandwidth 400, and with continuing reference to the graph coloring 300 for the layout 200, in the first group CBSD node 1 requires 30 MHz of bandwidth. Also in the first group, CBSD node 6 only requires 10 MHz and is allocated a 10 MHz portion of the 30 MHz allocated to node 1. Turning to the second group, each of CBSD nodes 2 and 3 requires 20 MHz and is allocated as such. CBSD node 4, also in the second group, only requires 10 MHz and is allocated a 10 MHz portion of the 20 MHz allocated to CBSD nodes 2 and 3.

However, as group 1 requires 30 MHz and group 2 requires a different 20 MHz, the entire 50 MHz is allocated and the third group has no available spectrum. Accordingly, this allocation is not feasible. An alternate allocation may be performed by deleting the weakest edge, recoloring, and then reallocation spectrum to the new coloring.

Figure 5:
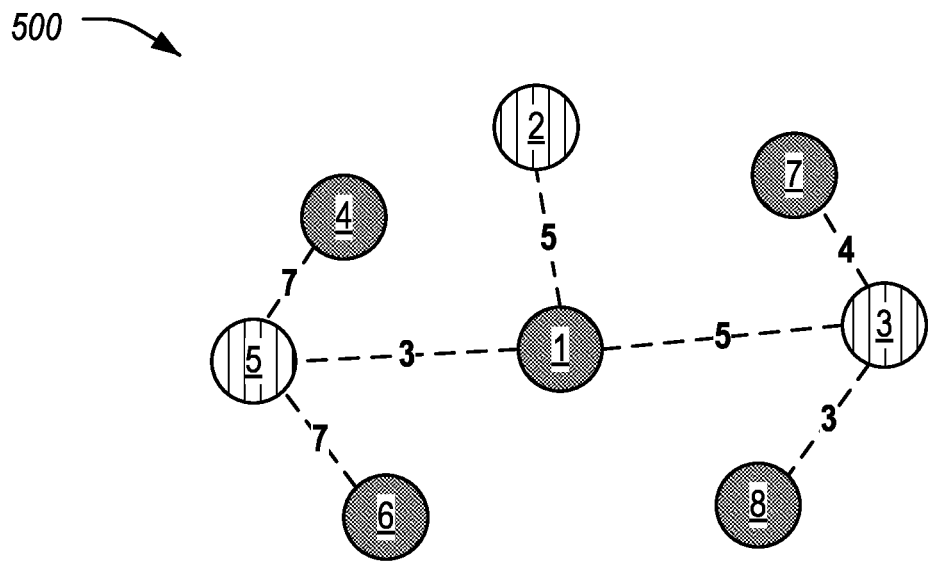
FIG. 5 illustrates an alternate example graph coloring of the layout of the terminal of FIG. 2 utilizing two colors.

FIG. 5 illustrates an alternate example graph coloring 500 of the layout of the terminal 200 utilizing two colors. Here, the weakest edge, the edge as shown with weight 2 between CBSD access points 1 and 4 has been removed. As shown, the coloring divides the nodes into two color groups: a first group including CBSD access points 1, 4, 6, 7, and 8; and a second group including CBSD access points 2, 3 and 5.

Figure 6:
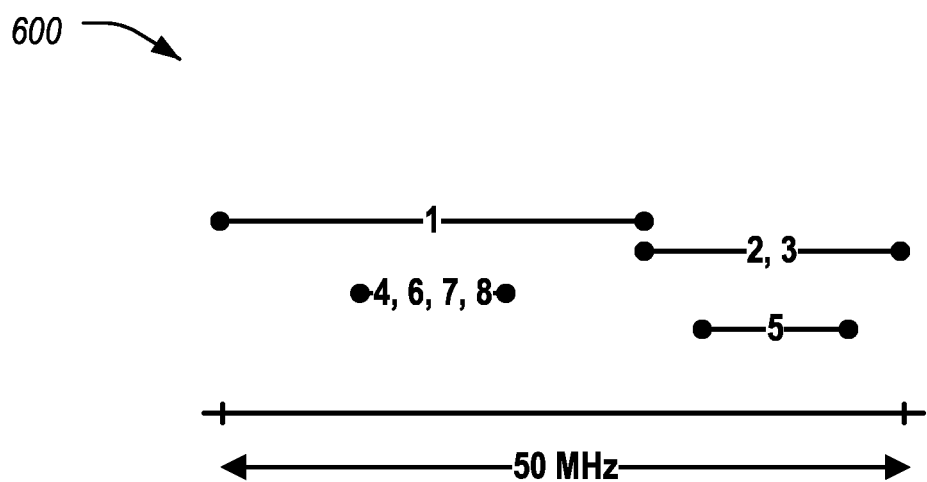
FIG. 6 illustrates an example allocation of bandwidth to the nodes in accordance with the alternate graph coloring of FIG. 5.

FIG. 6 illustrates an example allocation of bandwidth 600 to the nodes in accordance with the graph coloring 500. In the example the SAS 108 is again authorized to allocate 50 MHz among the nodes. As shown in the allocation of bandwidth 600, and with continuing reference to the graph coloring 500 for the layout, in the first group CBSD access point 1 requires 30 MHz of bandwidth. Also in the first group, CBSD access points 4, 6, 7, and 8 only require 10 MHz and are each allocated a 10 MHz portion of the 30 MHz allocated to CBSD access point 1. Turning to the second group, each of CBSD access points 2 and 3 requires 20 MHz and is allocated as such. CBSD access point 5, also in the second group, only requires 10 MHz and is allocated a 10 MHz portion of the 20 MHz allocated to CBSD access points 2 and 3. This layout fits within the 50 MHz allocation and is therefore feasible. Accordingly, the allocation of spectrum is complete.

Figure 7:
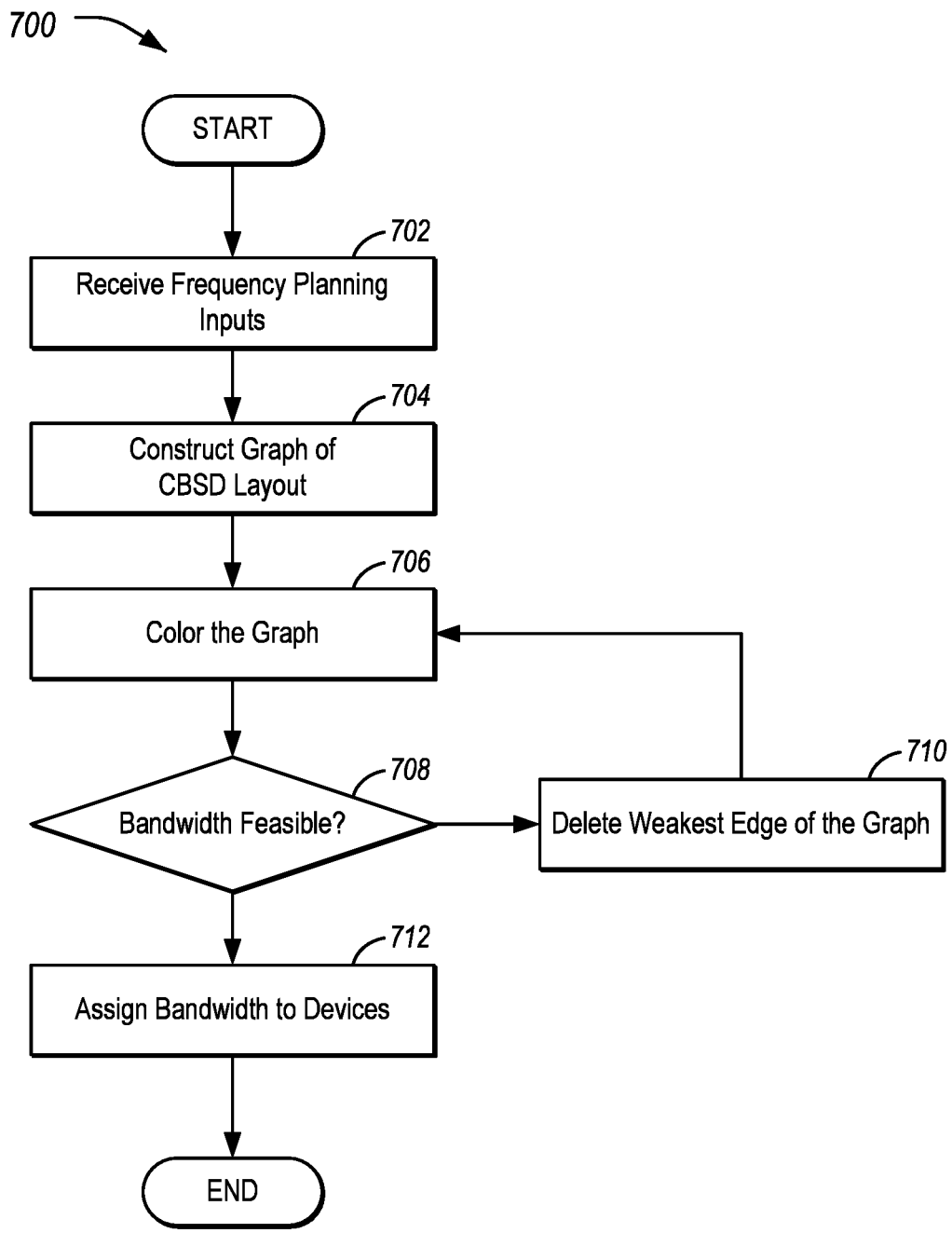
FIG. 7 illustrates an example process for performing inhomogeneous frequency planning.

FIG. 7 illustrates an example process 700 for performing inhomogeneous frequency planning. In an example, the process 700 may be performed by the SAS 108 of the system 100.

At operation 702, the SAS 108 receives inputs for performing the frequency planning. In an example, the SAS 108 receives a SAS-allocated frequency range of X MHz. The SAS 108 may also identify that each of the CBSD access points 104 requires $x_i \times 10$ MHz bandwidth, $1 \leq x_i \leq \lfloor X/10 \rfloor$. The SAS 108 also receive location and interference information with respect to the CBSD access points 104.

At operation 704, the SAS 108 constructs a graph G with CBSD access points 104 as vertices and weighted edges denoting interference between the vertices. An example graph is illustrated in the layout.

At operation 706, the SAS 108 colors the graph G. As used herein, to color refers to a proper vertex coloring, i.e., a labeling of the vertices of the graph G with colors such that no two vertices sharing the same edge have the same color. This may be performed using a graph coloring algorithm such as a brute-force search, dynamic programming to provide a bound on the number of maximal independent sets, the principle of inclusion-exclusion and Yates's algorithm, and/or a greedy algorithm. The coloring may be defined as C=Graph_color(G), where C is a set of tuples including the colors and their corresponding bandwidth requirements.

At operation 708, the SAS 108 determines whether the total bandwidth required by the set of tuples C satisfies the allocated frequency range of X MHz (i.e., whether the configuration is feasible). This may be determined, for example as whether $\Sigma_c$ BW>X. If the total bandwidth required by the set of tuples C exceeds X, control passes to operation 710. At operation 710, the SAS 108 deletes the weakest edge of graph G. After operation 710, control returns to operation 706. If, at operation 708, the total bandwidth required by the set of tuples C satisfies X, control passes to operation 712.

At operation 712, the SAS 108 assigns the desired bandwidth to each color C. It should be noted that some many examples, when two CBSD access points 104 with different bandwidth requirements are assigned the same color C, the channel allocated to the smaller request may be situated around a midpoint of the larger bandwidth allocation. This may be done to minimize out-of-band emissions with other color C channels. After operation 712, the process 700 ends.

As noted above, interference among the CBSD access points 104 can degrade the throughput performance of the network 106. The amount of mutual interference between CBSD access points 104 is proportional to the load served by each, their frequency channel allocations, and RF characteristics of CBSD access points 104 and the environment. An algorithm is described for the assignment of autonomous vehicles (AVs) arriving at a terminal facility to the CBSD access points 104 can help minimize such mutual interference and thus increase the throughput of the network.

Figure 8:
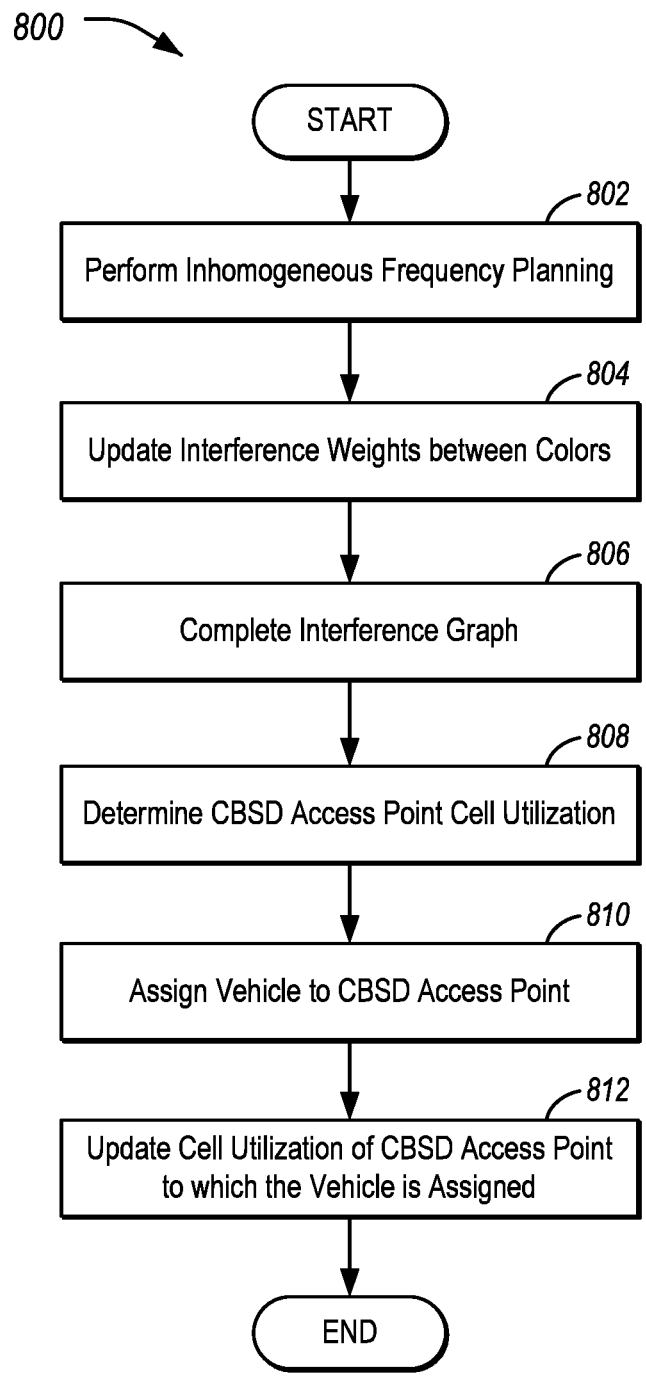
FIG. 8 illustrates an example process for the assignment of arriving vehicles to the CBSD access points of a terminal.

FIG. 8 illustrates an example process 800 for the assignment of arriving vehicles to the CBSD access points 104 of a terminal. Upon arrival, each AV is to be routed to one of the N available CBSD access points 104. The AV may include CBSD UE 102, as discussed above.

At operation 802, the SAS 108 performs inhomogeneous frequency planning. This may include, for example, construction of a graph with CBSD access points 104 as vertices and weighted edges denoting interference between the vertices, coloring of the graph, and assigning desired bandwidth to each color of the graph. In an example, the SAS 108 assigns the CBSD access points 104 to channels according to the process 700 described in detail above.

Figure 9:
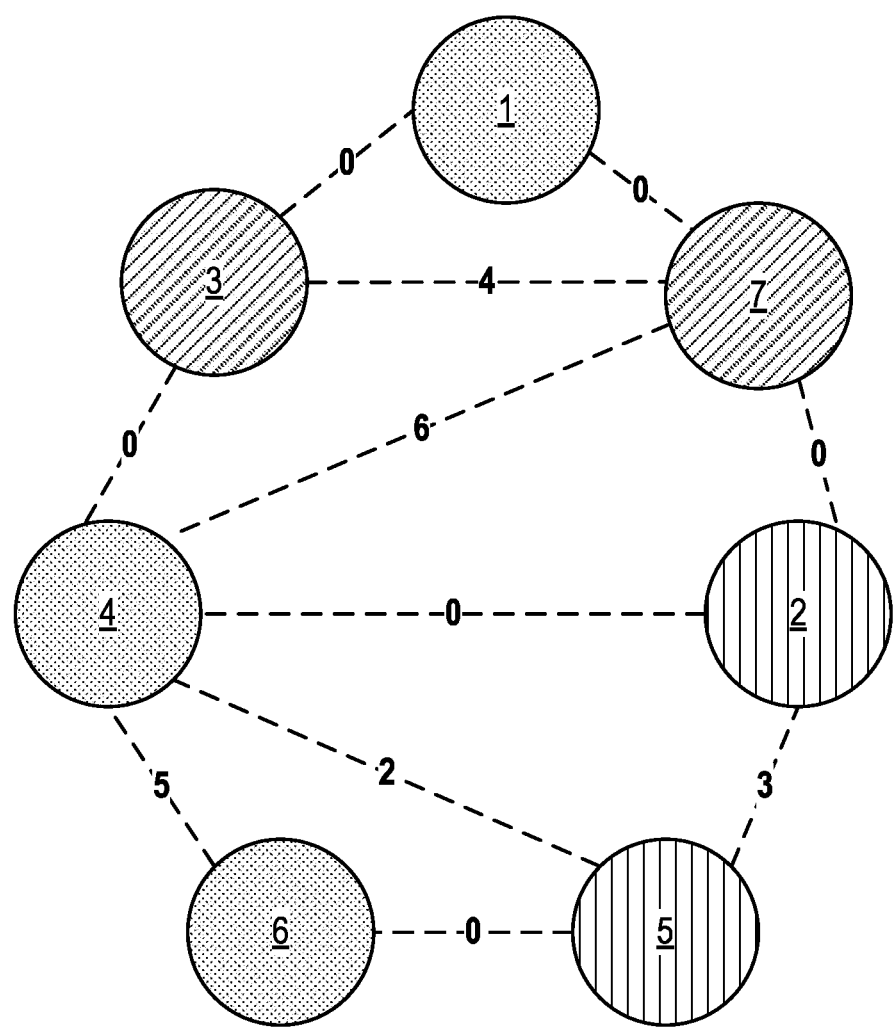
FIG. 9 illustrates an example interference graph.

FIG. 9 illustrates an example interference graph 900. As shown in FIG. 9, and with continued reference to FIG. 8, in the interference graph 900, each vertex represents a CBSD access point 104 and each weighted edge represents a relative amount of interference observed by the CBSD access point 104 due to coverage overlap between the CBSD access points 104. The interference weights between CBSD access points 104 may be normalized by the maximum possible (e.g., by 10 in a scale from 0 to 10 as in the illustrated example). The scale may be linear, logarithmic, exponential, etc.

Figure 10:
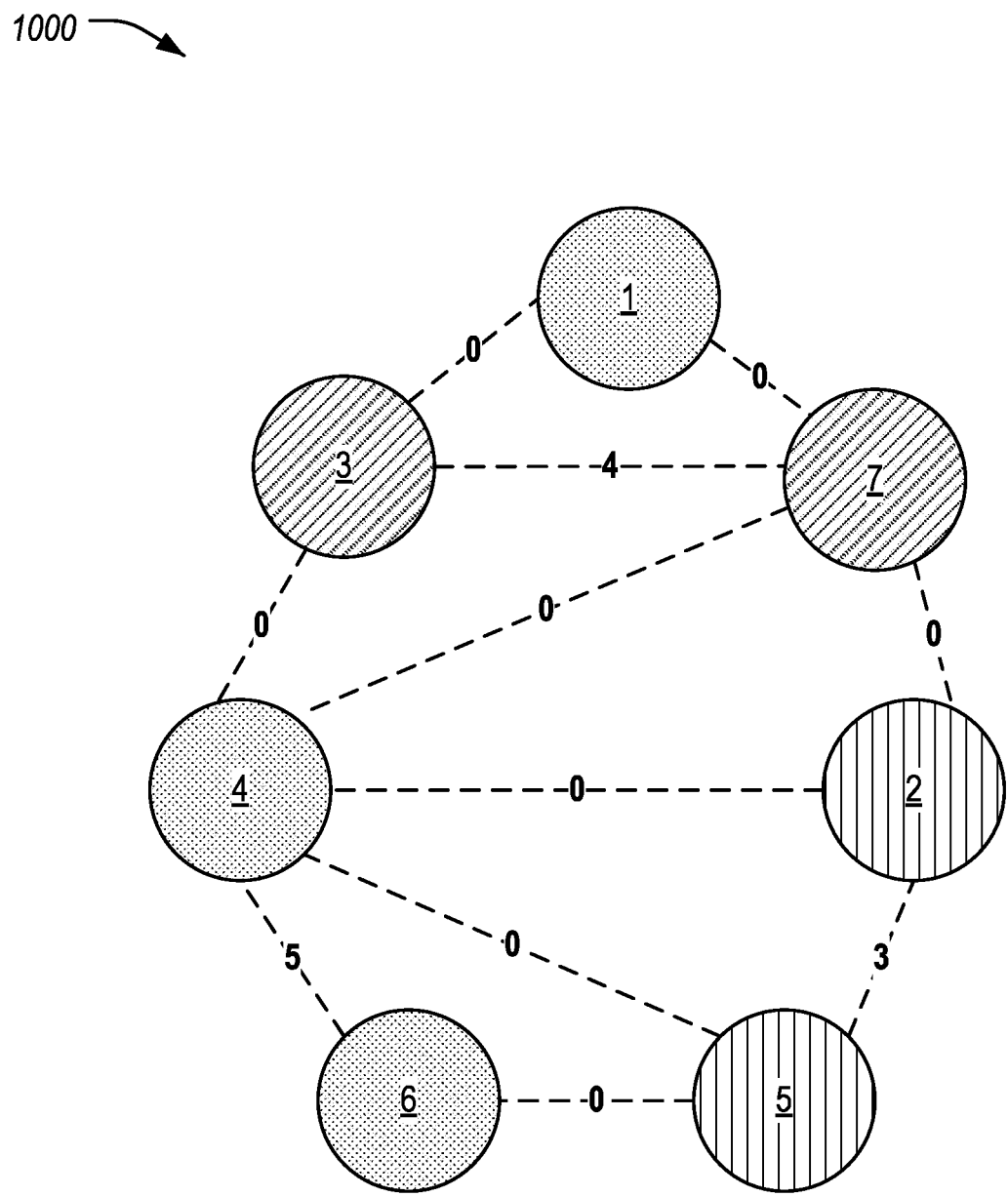
FIG. 10 illustrates an example interference graph having zero weights assigned to edges of the graph that connect vertices of disparate colors.

At operation 804, the SAS 108 updates the weights between vertices of different colors. For instance, any edges between vertices of different colors may be assigned weights of zero. FIG. 10 illustrates an example interference graph 1000 having a weight of zero assigned to edges of the graph that connect vertices of disparate colors (channels). For instance, the edges between CBSD access points 3 and 4 and CBSD access points 4 and 5 of the interference graph 900 have been updated in the interference graph 1000 to be zero. This updating may be performed, as those CBSD access points 104 would not be interfering with one another.

Figure 11:
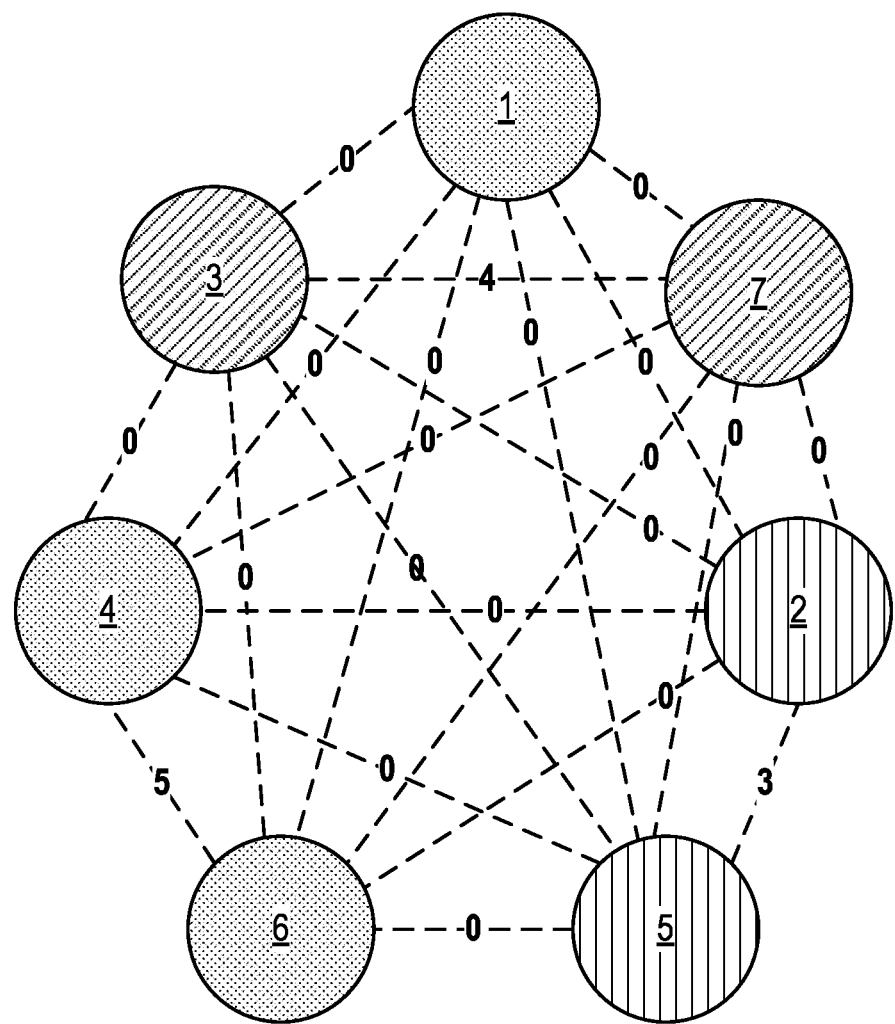
FIG. 11 illustrates an example interference graph having zero weight edges added between the remaining vertices such that a complete graph results.

At operation 806, the SAS 108 completes the graph. For instance, for any two vertices that lack an edge between them, the SAS 108 may add an edge between the two vertices having a weight of zero. FIG. 11 illustrates an example interference graph 1100 having zero weight edges added between the remaining vertices such that a complete graph, $K_N$, results. As shown in the interference graph 1100, zero weighed edges have been added between each of the CBSD access points of the example interference graph 1000 that lacked an edge.

At operation 808, the SAS 108 determines cell utilization for each CBSD access point 104. More specifically, for each CBSD access point 104 cell, $C_i$, the cell utilization, $U_{C_i}$, is determined. This cell utilization refers to the amount of upload traffic (and/or download traffic) being served by the respective CBSD access point 104. These cell utilization rates may father be normalized by the total CBSD access point 104 capacity for ease in computation.

At operation 810, the SAS 108 assigns the arriving vehicle to a CBSD access point 104 node (i.e., a vertex of the interference graph 900). One example way to do so is that, for each vertex $C_i$, the SAS 108 computes $I_{C_i} = U_{C_i} \times \max w(C_i)$, where $w(C_i)$ is the normalized weight of an edge incident on $C_i$. This metric is a measure of how unfavorable vertex $C_i$ is, in terms of causing interference to other vertices. The SAS 108 then sorts $I_{C_i}$, $1 \leq i \leq N$ in ascending order. The first element of this sorted list is therefore the node that is the most favorable to use in terms of generating the least interference.

At operation 812, the SAS 108 updates $U_{C_i}$ for the vertex to which the vehicle was routed. Accordingly, further assignments of vehicle may therefore use the updated $U_{C_i}$. After operation 812, the process 800 ends.

Figure 12:
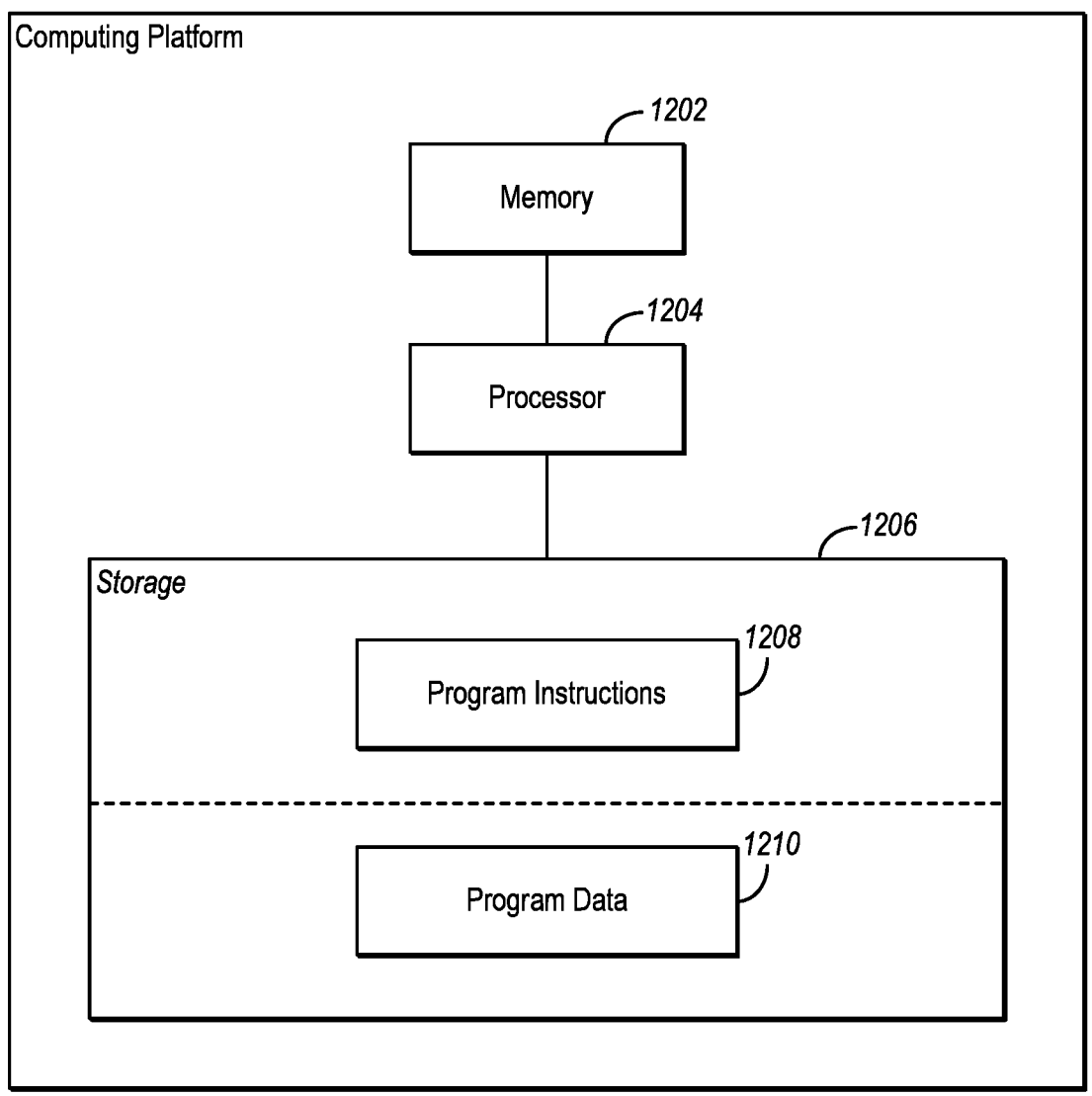
FIG. 12 illustrates an example computing device for performing inhomogeneous frequency planning as well as assignment of arriving vehicles to the CBSD access points of a terminal.

FIG. 12 illustrates an example computing device 1200 for performing inhomogeneous frequency planning as well as assignment of arriving vehicles to the CBSD access points 104 of a terminal. The algorithms and/or methodologies of one or more embodiments discussed herein may be implemented using such a computing device. For instance, the operations performed herein, such as those of the processes 700 and 800, may be implemented with such a computing device 1200. For instance, the SAS 108 may include one or more such computing devices 1200. The computing device 1200 may include memory 1202, processor 1204, and non-volatile storage 1206. The processor 1204 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 1202. The memory 1202 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 1206 may include one or more persistent data storage devices such as a hard drive, optical drive, tape drive, non-volatile solid-state device, cloud storage or any other device capable of persistently storing information.

The processor 1204 may be configured to read into memory 1202 and execute computer-executable instructions residing in program instructions 1208 of the non-volatile storage 1206 and embodying algorithms and/or methodologies of one or more embodiments. The program instructions 1208 may include operating systems and applications. The program instructions 1208 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 1204, the computer-executable instructions of the program instructions 1208 may cause the computing device 1200 to implement one or more of the algorithms and/or methodologies disclosed herein. The non-volatile storage 1206 may also include data 1210 supporting the functions, features, and processes of the one or more embodiments described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for allocating vehicles among network devices, comprising:
   a controller of a network, configured to perform an allocation of a set bandwidth, the allocation including to
      construct a graph of the network devices, each network device serving an amount of bandwidth over the network, each vertex of the graph corresponding to a respective one of the network devices, each edge of the graph connecting network devices by interference weight, such that edges between connected network devices using different channels have an interference weight of zero, and edges between connected network devices using the same channel have an interference weight denoting an amount of interference between the connected network devices;
      determine a cell utilization of each of the network devices according to an amount of traffic served by the respective network device compared to a total of the amounts of bandwidth for all network devices; and
      assign a vehicle requesting bandwidth to the one of the network devices having a smallest product of cell utilization and maximum interference weight edge.

2. The system of claim 1, wherein the controller is further configured to update the cell utilization of the one of the network devices to account for the bandwidth requested by the vehicle.

3. The system of claim 1, wherein the controller is further configured to:
   identify whether the one of the network devices has available bandwidth to service the vehicle before assigning the vehicle to the one of the network devices; and
   if the one of the network devices lacks the available bandwidth, assign the vehicle requesting bandwidth to the one of the network devices having a next smallest product of cell utilization and maximum interference weight edge.

4. The system of claim 1, wherein the controller is further configured to normalize the interference weights along a scale such that the maximum interference weight in the graph is a maximum value of the scale.

5. The system of claim 1, wherein the network is a Citizens Broadband Radio Service (CBRS) network, the controller is a spectrum access system (SAS) of the CBRS, and the network devices are CBRS devices (CBSDs).

6. The system of claim 1, wherein the vehicle is an autonomous vehicle.

7. A method for allocating vehicles among network devices, comprising:
constructing a graph of the network devices, each network device serving an amount of bandwidth over the network, each vertex of the graph corresponding to a respective one of the network devices, each edge of the graph connecting network devices by interference weight, such that edges between connected network devices using different channels have an interference weight of zero, and edges between connected network devices using the same channel have an interference weight denoting an amount of interference between the connected network devices;
determining a cell utilization of each of the network devices according to an amount of traffic served by the respective network device compared to a total of the amounts of bandwidth for all network devices; and
assigning a vehicle requesting bandwidth to the one of the network devices having a smallest product of cell utilization and maximum interference weight edge.

8. The method of claim 7, further comprising updating the cell utilization of the one of the network devices to account for the bandwidth requested by the vehicle.

9. The method of claim 7, further comprising:
identifying whether the one of the network devices has available bandwidth to service the vehicle before assigning the vehicle to the one of the network devices; and
if the one of the network devices lacks the available bandwidth, assigning the vehicle requesting bandwidth to the one of the network devices having a next smallest product of cell utilization and maximum interference weight edge.

10. The method of claim 7, further comprising normalizing the interference weights along a scale such that the maximum interference weight in the graph is a maximum value of the scale.

11. The method of claim 7, wherein the network is a Citizens Broadband Radio Service (CBRS) network, the assigning is performed by a spectrum access system (SAS) of the CBRS, and the network devices are CBRS devices (CBSDs).

12. The method of claim 7, wherein the vehicle is an autonomous vehicle.

13. A non-transitory computer readable medium including instructions for allocating vehicles among network devices, that, when executed by a computing device, cause the computing device to perform operations comprising to:
construct a graph of the network devices, each network device serving an amount of bandwidth over the network, each vertex of the graph corresponding to a respective one of the network devices, each edge of the graph connecting network devices by interference weight, such that edges between connected network devices using different channels have an interference weight of zero, and edges between connected network devices using the same channel have an interference weight denoting an amount of interference between the connected network devices;
determine a cell utilization of each of the network devices according to an amount of traffic served by the respective network device compared to a total of the amounts of bandwidth for all network devices; and
assign a vehicle requesting bandwidth to the one of the network devices having a smallest product of cell utilization and maximum interference weight edge.

14. The medium of claim 13, further including instructions that, when executed by the computing device, cause the computing device to perform operations comprising to update the cell utilization of the one of the network devices to account for the bandwidth requested by the vehicle.

15. The medium of claim 13, further including instructions that, when executed by the computing device, cause the computing device to perform operations comprising to:
identify whether the one of the network devices has available bandwidth to service the vehicle before assigning the vehicle to the one of the network devices; and
if the one of the network devices lacks the available bandwidth, assign the vehicle requesting bandwidth to the one of the network devices having a next smallest product of cell utilization and maximum interference weight edge.

16. The medium of claim 13, further comprising normalizing the interference weights along a scale such that the maximum interference weight in the graph is a maximum value of the scale.

17. The medium of claim 13, wherein the network is a Citizens Broadband Radio Service (CBRS) network, the computing device is a spectrum access system (SAS) of the CBRS, and the network devices are CBRS devices (CBSDs).

18. The medium of claim 13, wherein the vehicle is an autonomous vehicle.

* * * * *